Oct. 14, 1958  G. B. FENTON  2,856,181
DOORS OR CLOSURE MEMBERS FOR BOMB BAYS OR LIKE
SPACES IN THE FUSELAGES OR WINGS OF AIRCRAFT
Filed April 15, 1955  3 Sheets-Sheet 1

GEORGE BURRELL FENTON
INVENTOR.

BY
Richardson David and Nerdon

Oct. 14, 1958  G. B. FENTON  2,856,181
DOORS OR CLOSURE MEMBERS FOR BOMB BAYS OR LIKE
SPACES IN THE FUSELAGES OR WINGS OF AIRCRAFT
Filed April 15, 1955  3 Sheets-Sheet 2

GEORGE BURRELL FENTON
INVENTOR.

BY
Richardson, David and Naidon
ATTORNEYS.

Oct. 14, 1958         G. B. FENTON         2,856,181
DOORS OR CLOSURE MEMBERS FOR BOMB BAYS OR LIKE
SPACES IN THE FUSELAGES OR WINGS OF AIRCRAFT
Filed April 15, 1955         3 Sheets-Sheet 3
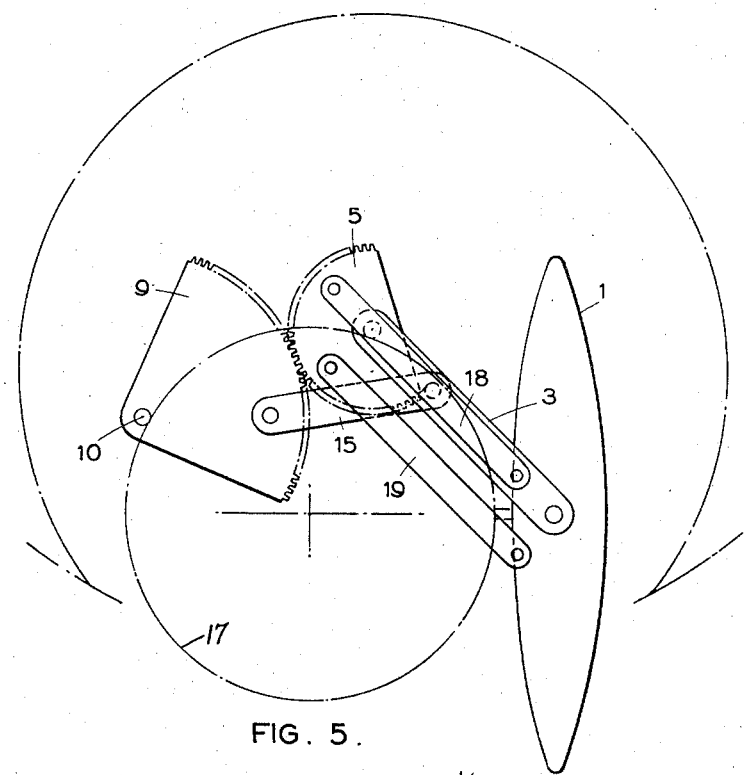
FIG. 5.
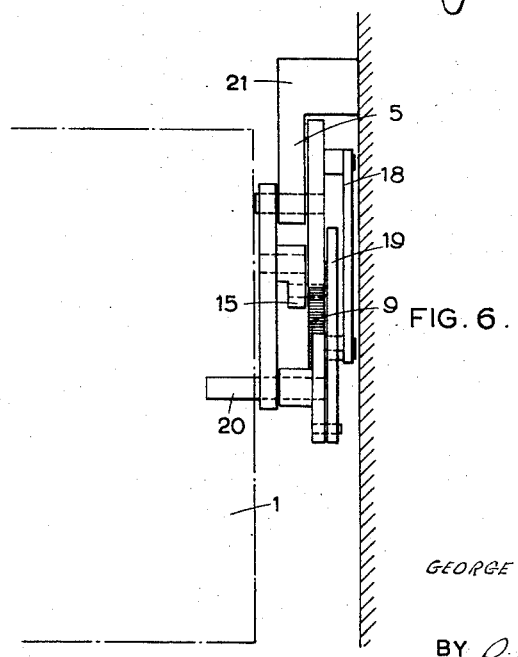
GEORGE BURRELL FENTON
INVENTOR.
BY *Richardson, David and Nordon*
ATTORNEYS.

United States Patent Office 2,856,181
Patented Oct. 14, 1958

2,856,181

DOORS OR CLOSURE MEMBERS FOR BOMB BAYS OR LIKE SPACES IN THE FUSELAGES OR WINGS OF AIRCRAFT

George Burrell Fenton, Kirkella, England, assignor to Blackburn and General Aircraft Limited, Brough, East Yorkshire, England, a British company Application April 15, 1955, Serial No. 501,679

Claims priority, application Great Britain December 13, 1954

8 Claims. (Cl. 268—30)

This invention relates to improvements in doors which are rotatable from one position in which parts carried thereby are concealed within a container to another position in which such carried parts are exposed, and it is more especially concerned with such a door for aircraft to close a space, more particularly in the fuselage, such that a bomb or bombs, rockets, guns and so forth may normally be carried in such space and as required be brought into exposed operative position.

A door which merely rotates about a fixed axis which passes through the door itself has the disadvantage that the door must be relatively wide to permit the bomb load carried thereby to pass from its concealed to its exposed position and there is a further disadvantage that the mass of the bomb load, which will considerably outweigh the mass of the door, is unbalanced about the hinge axis so giving rise to a moment tending to accelerate the movement of the door, particularly during opening movement, which may give rise to trouble at the arresting of the door in its open inverted position with the bomb load exposed.

One object of the present invention is to provide a rotary door which is narrower for a given height or size of load than hitherto possible.

Another object of the present invention is to provide such rotary door which will seal the compartment in the aircraft fuselage or wing in both its alternative positions, and which is such that when the load carried thereby is in exposed position not only does no part of the door project beyond the ambient surface into the slip stream but the exposed surface of the door maintains the contour of such ambient surface.

To these ends, the door according to the present invention in passing between normal and reversed positions is displaced laterally and rotated about an axis extending therethrough.

In this way the door is moved from its one position in which its edges seal the space closed thereby by a bodily side-ways movement with simultaneous rotation through 180° about the axis passing therethrough into its alternative position in which its edges again seal the space in the container such as a fuselage or wing of an aircraft.

The door preferably is of like shape on both its surfaces so that in each of its alternative positions, the exposed surface maintains the contour of the ambient surface of the structure, e. g. the aircraft fuselage or wing.

Further according to the present invention the door is carried at its ends by pivoted links for rotation about an axis passing through the connection of such links thereto and is provided with operating mechanism such that the links are displaced in timed relation with rotation of the door during movement from its one position to the other.

Still further according to the present invention a drivable quadrant meshes with a quadrant the rotation of which effects rotation of the door and carries a link connected to the door carrying link, such that movement of said first quadrant effects the simultaneous displacement and rotation of the door.

The drivable quadrant may be rotated by any convenient means conveniently by a hydraulic jack, electric actuator, a screw jack or other extensible member whilst the quadrant which meshes therewith effects rotation of the door through the medium of an endless chain passing over sprocket wheels or by means of a parallel linkage system or other such means which will transmit the rotation of the quadrant through to the door. When the drivable quadrant is moved by linear extending means, the link connecting such quadrant to the door carrying links is conveniently connected at the point of connection of such means to the quadrant.

The door according to the present invention, as applied to aircraft, may carry a load in the form of a single large bomb, or two or more bombs disposed end-to-end or side-by-side or both end-to-end and side-by-side, rockets in parallel side-by-side relation or parallel side-by-side and superposed arrangement, a large calibre gun or a plurality of guns, or other load which is normally carried internally but in operative position must be exposed externally of the aircraft.

In all cases due to the lateral displacement and rotation of the door, a larger or higher load can be taken through a given size opening than is possible by a mere rotation of the door and by the door mounting of the present invention there is a more favourable displacement of the masses in an arrangement which ensures positive operation.

In order that the invention may be clearly understood and readily carried into effect an embodiment thereof with alternative actuating mechanism is hereinafter more fully described, with reference to the accompanying diagrammatic drawings which are given for purposes of illustration only, and not of limitation. In these drawings:

Figure 5 is a view similar to Figure 3 showing a different mechanism for effecting rotation of the door during its displacement between normal and inverted positions, and Figure 6 is a view looking on Figure 5 in the direction of the arrow.

Figure 1:
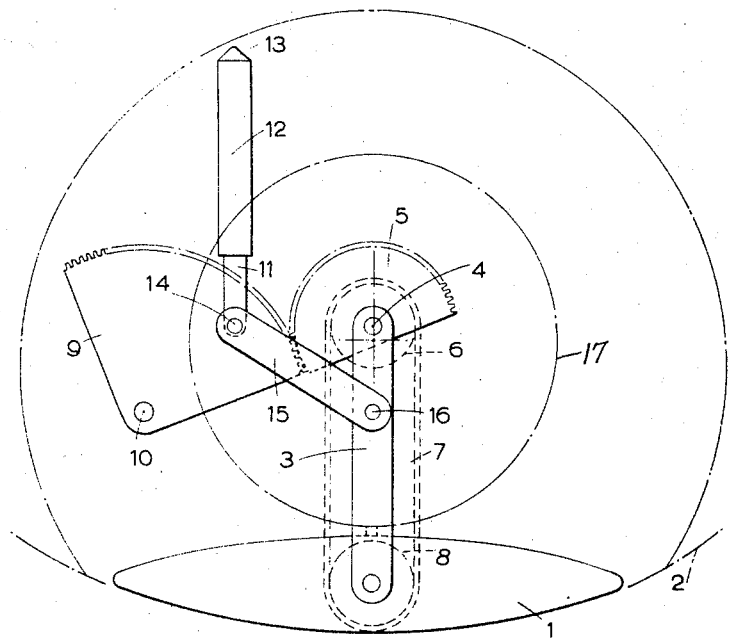
Figure 1 is an end elevation of the door with one form of actuating mechanism, with the door shown in its normal or closed position.
Figure 2:
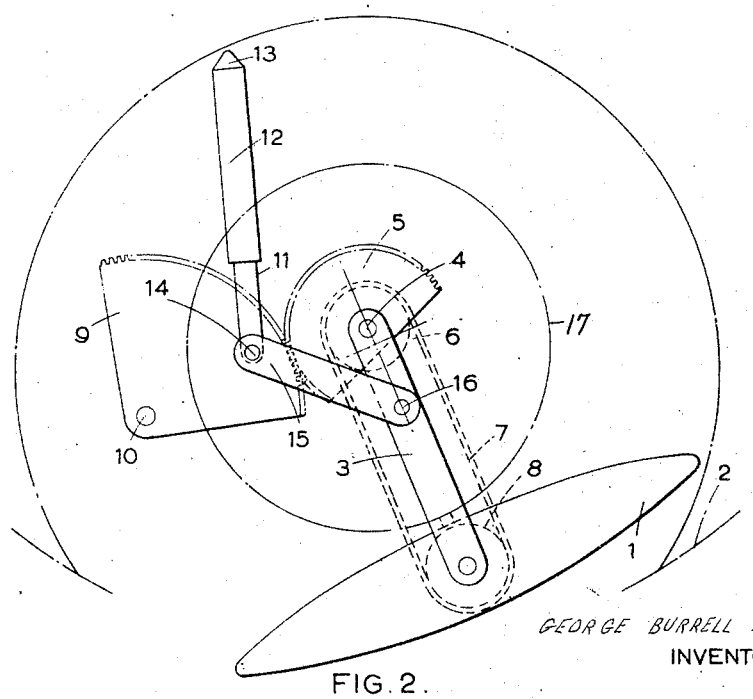
Figure 2 is a view similar to Figure 1 after displacement of the door through one quarter of its displacement and rotation.
Figure 3:
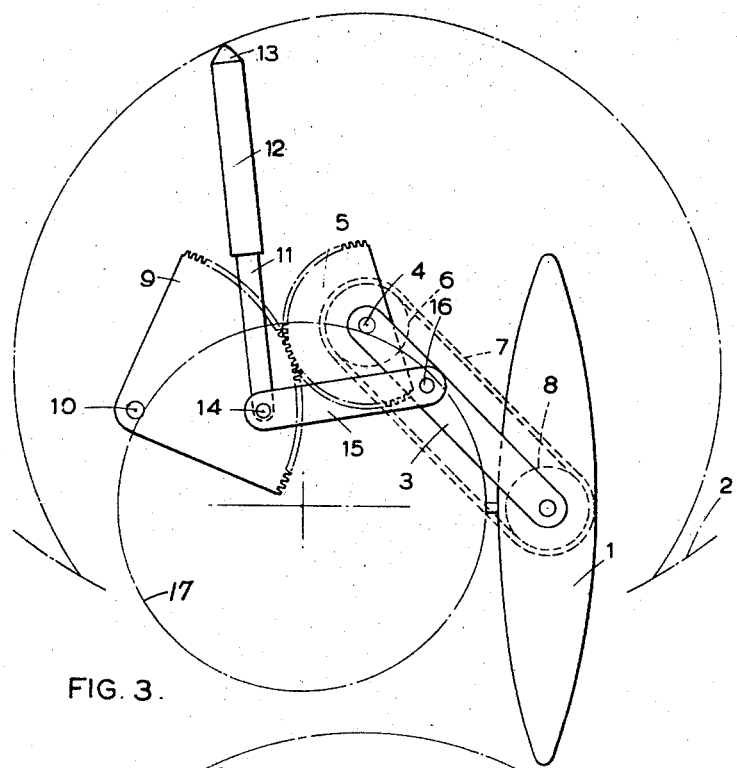
Figure 3 is again a similar view showing the door half way through its travel and Figure 4 is again a similar view after the door has completed its travel in the inverted position in which it again closes the door opening.
Figure 4:
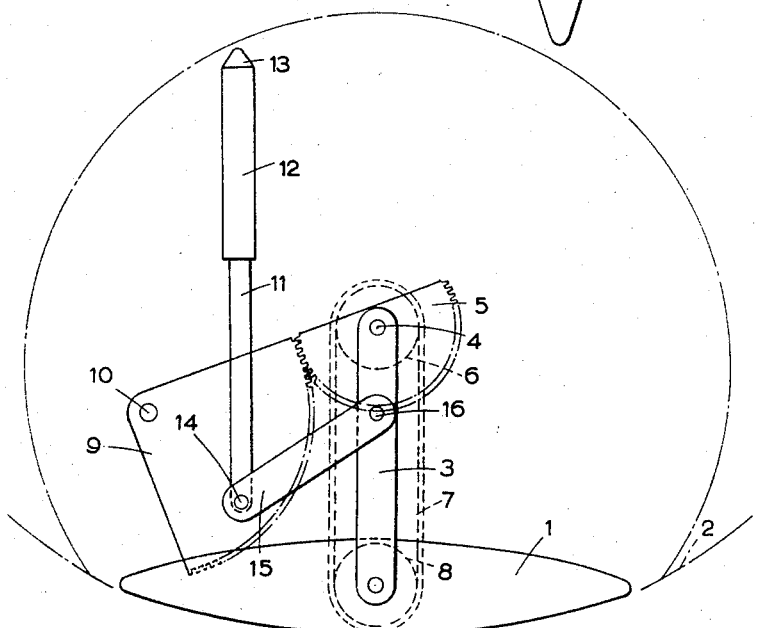

Referring now to the said drawings, and in particular to Figures 1 to 4 thereof, a door 1, which normally closes an aperture such as that opening into a bomb bay or like receptacle in the fuselage 2 of an aircraft, is carried at its ends rotatably, by a link or pivoted arm 3 pivoting on a shaft 4 or the equivalent carried by the fuselage structure. Rotatably mounted on such shaft 4 is a quadrant 5 fast with which is a sprocket wheel 6 around which extends an endless chain 7 which also passes around a sprocket wheel 8 fast with the door 1. A quadrant 9, which is pivoted at 10, meshes with the quadrant 5 and is arranged to be rocked about its pivot 10 by an extensible member 11, such as the ram of a hydraulic jack 12 or the equivalent, the body of which is pivotally connected at 13 to the aircraft structure. The end of the extensible member or ram 11 is connected to the quadrant 9 at 14 at which point is also pivotally connected one end of a link 15, the other end of which is pivotally connected at 16 to the link or arm 3. This arrangement is such that on expansion of the jack 12, the movement of its ram 11 rocks the quadrant 9 about its pivot point 10 and due to the meshing engagement of that quadrant with the quadrant 5, rotates the latter in anti-clockwise direction as illustrated in the drawings. Rotation of the quadrant 5 rotates the sprocket wheel 8, so rotating the door 1 about an axis which passes therethrough and the point of connection of the links 3 to the door 1. Simultaneously the displacement of the quadrant 9 is taken through the link 15 to the door supporting link 3 so that the latter link is rocked about the pivot 4 so bodily displacing the door laterally. In Figure 1 the door is shown in its normal position, whilst in Figure 2 the door is shown at one quarter of its travel during which its displacement laterally is one half of its bodily movement and is turned through approximately one quarter of its rotationary travel. In Figure 3 the door is shown in its half-way position at the completion of its maximum lateral displacement and half-way through its rotationary movement. Further movement of the quadrant 9 continues to rotate the door but it pulls back the link 15 and the link 3, so that on completion of the travel of the quadrant 9 the door 1 is brought back to its original position, after being completely inverted for its edges once again to seal the opening which the door normally closes. By virtue of this lateral bodily displacement with simultaneous rotation of the door a much larger and higher load can be carried thereby, and taken out through the opening which the door closes. Thus the circle 17 indicates a bomb or other store carried by the door and capable of being taken out through the door opening as will be seen in Figure 3 through to the position shown in Figure 4 in which it is carried externally of the aircraft.

Other mechanism may be employed for bringing about the rotation of the door than the sprocket wheels and endless chain above described, and such mechanism may for example take the form illustrated in Figures 5 and 6 in which similar parts bear like reference numerals and in which the door 1 is rotated by parallel link mechanism. As illustrated in Figures 5 and 6 the drivable quadrant 9 meshes with and drives the quadrant 5 to which are connected the ends of parallel links 18 and 19 which are interconnected to a part fast with the door for rotation about the point 20 connecting the supporting link 3 which is displaceable by the link 15 connecting the same to the quadrant 9, the mechanism being carried by a bracket 21 secured to the structure.

The exterior of the door 1 is curved to match, or in other words, maintain the contour of the fuselage and it is preferred, therefore, to construct the door as a symmetrical design with like inner and outer surfaces so that when in inverted position, the door not only closes the opening but its now exposed surface maintains the contour of the ambient surface.

What I claim is:

1. A door having parallel sides and ends, door carrying links, means for rotatably connecting said door ends to said links, a toothed wheel fast with said door end, an endless chain passing around said toothed wheel and another toothed wheel, a toothed quadrant fast with said other toothed wheel, a second toothed quadrant meshing with said toothed quadrant, means for imparting limited rotation to said second toothed quadrant, and link means connecting said quadrant to said door carrying links.

2. A door as claimed in claim 1 in which the means for rotating said second toothed quadrant is an extensible device such as a jack.

3. A door having parallel sides and ends, door carrying links rotatably connected to said door ends, a toothed quadrant on the pivot axis of said links, a parallel linkage system connecting said door to said links, a driving quadrant in mesh with said toothed quadrant, means for imparting limited rotation to said driving quadrant, and link means connecting said driving quadrant with said door carrying links.

4. In combination, a surface provided with an opening, a door displaceably positioned across said opening, pivoted links at the ends of said door and pivotally connected to said door at its axis, means for displacing the ends of said links connected with said door thereby to displace said door laterally, and means for rotating said door about its axis in timed relation with the displacement of said pivoted links, said rotating means comprising a drivable quadrant and a second quadrant in mesh with said drivable quadrant, and a link pivotally connecting said second quadrant and door, said displacing means comprising a link carried by said drivable quadrant and connected to said pivoted links, whereby the movement of said drivable quadrant effects the simultaneous displacement and rotation of the door.

5. In combination, a surface provided with an opening, a displaceable door capable of rotating through 180° to close said opening in its initial and final positions, door-carrying links pivotally connected to the ends of said door, a first rotatable member, means for conveying rotation of said first rotatable member to said door so as to rotate the same about said pivotal connection of said links to said door, a second rotatable member for rotating said first rotatable member, extensible jack means for rocking said second rotatable member, and link means connecting said second rotatable member with said door-carrying links.

6. The combination claimed in claim 5, in which the means for conveying rotation of said first rotatable member to said door comprises a toothed wheel fast to said first rotatable member, a similar toothed wheel fast to said door, and an endless chain passing around said toothed wheels.

7. In combination, a surface provided with an opening, a door capable of rotating through 180° to close said opening in its initial and final positions, door-carrying links, means rotatably connecting the ends of said door to said door-carrying links, a first toothed quadrant rockable on the axis of said door-carrying links, means for transmitting movement of said first quadrant to said door so as to rotate the same about said rotatable connecting means, a second toothed quadrant meshing with said first quadrant, an extensible jack, means for connecting said jack to said second quadrant so as to rock the same, and link means connecting said second quadrant to said door-carrying links.

8. The combination claimed in claim 7, in which the means for conveying the movement of said first quadrant to said door comprises a parallel linkage spaced apart from said door-carrying links.

References Cited in the file of this patent

UNITED STATES PATENTS

| | | |
|---|---|---|
| Re. 12,260 | Boos | Aug. 23, 1904 |
| 938,719 | Smith | Nov. 2, 1909 |
| 2,230,783 | Parsons et al. | Feb. 4, 1941 |
| 2,604,281 | Buchal et al. | July 22, 1952 |